Feb. 8, 1944. F. TROSTLER 2,341,247
SINK AND FLOAT SEPARATION PROCESS
Filed March 12, 1941 4 Sheets-Sheet 1

INVENTOR,
Fredrick Trostler
BY
Sommers & Young,
ATTORNEYS

Fig. 2.

Patented Feb. 8, 1944

2,341,247

UNITED STATES PATENT OFFICE 2,341,247

SINK AND FLOAT SEPARATION PROCESS

Fredrick Trostler, London, England

Application March 12, 1941, Serial No. 382,981
In Great Britain February 10, 1941

10 Claims. (Cl. 209—173)

The invention relates to the concentration of ores and other minerals, or, more generally speaking, to the separation of heterogeneous mixtures of solid particles having different densities, by the sink and float process. More particularly, it relates to the preparation of heavy suspension media for use in the said process, and the maintenance of the same in good usable condition, as by cleaning and reconditioning, during use. It makes use of principles and physical laws which, it is believed, have not previously been known or fully apprehended in the production and regeneration of such media, whereby various useful results are obtained.

The process herein described enables the preparation of a suspension medium, having any desired specific characteristics such as density, relative stability, and viscosity, with the solid phase of the dispersion formed from any type of solids. Desired properties of such media may be determined, previous to their preparation, and the same produced to specification in a simple and readily controlled manner, and the medium maintained in serviceable condition during use, these operations being conducted in such manner as to result in savings of cost respecting material and plant. Further, and more specifically, the invention establishes standards and procedure by which media having certain highly desirable characteristics (within the wide range of properties obtainable by the improved methods) may be produced in a simple, effective and comparatively inexpensive manner. Objects of the invention comprise the provision of improved methods directed to the purposes referred to, and to the production of improved separating medium, as will more fully appear hereinafter.

It may briefly be said at this point that the invention is largely based on the discovery that a medium may be produced of any specific characteristics, of a suspension of particles the sizes of which lie within a considerable range, say from about 300 mesh to less than 1500 mesh, by so producing or providing the particles that the aggregate extent of their surfaces per unit of weight or of volume of the medium will be in an ascertained ratio to the volume of the medium in which they are suspended. That is to say, for a desired medium—the density of which will be determined by the solid/liquid ratio and the density of the chosen solids—desired characteristics such as a prescribed settling rate may be obtained by providing a determined aggregate surface area for the particles suspended per unit of volume of the medium. This is true regardless of the sizes and proportioning of the various size fractions of which the particles may be composed, provided only that a sufficient balance between coarse and finer particles is provided to prevent premature precipitation of some of the coarsest particles. Within a certain density range media of practically identical viscosity and settling rate can be produced, almost irrespective of the mesh analysis and proportioning of the fractions, provided that the aggregate surface area of all particles in each medium, per unit of volume, is the same. Further, within each solid/water ratio or density range a minimum aggregate surface of the particles is required for obtaining a specified degree of stability with desired low viscosity, and a maximum aggregate surface may be determined at which there is an even slower settling rate and above which a prescribed upper limit of viscosity will be exceeded. Thereby a useful range is provided, (which differs for different densities), so that the aggregate surface areas need not be so closely calculated as would otherwise be the case, or so that, if particles of about the minimum aggregate surface are provided, the practical range within which increase of viscosity during operation is permissible becomes known, thereby establishing the requirements for cleaning and reconditioning the medium. The minimum and maximum surface values in the various density ranges are in strict mathematical relation to each other, and can be calculated and plotted, for any desired set of medium characteristics.

In order that the invention may be more clearly understood attention is directed to the accompanying drawings, in which.

While, as stated, the improved process may be used for the preparation of media having a wide range of characteristics I am particularly concerned with the production of media which are suspensions of variously-sized particles, in water or other liquid, which have a high degree of stability without agitation, and the viscosity of which does not exceed prescribed limits. The following description will be based, by way of example, on the preparation of such media.

Reference to "stability" of a medium herein, to be useful, must be more clearly defined than is usual.

The media herein referred to, by way of example, are to have stability such that the specific gravity of the bath in the usual separator cone or vessel is to be maintained constantly with no more than a very slight differential, so that the specific gravity at the bottom is to be no more than .01-.02 above that of the medium fed into, or near to, the top of the separator. This is only a partial specification, since such a density differential can be obtained with a comparatively unstable medium by the use of strong upward currents to counteract the settlement of solids, or by the use of a sufficient downward current, to overtake the settling out of solids, as is explained in the joint application of myself and Thomas Andrews, Serial No. 371,839, filed December 26, 1940.

The stability which I particularly desire, and which is produced in the media the preparation of which will be particularly described, is such that the specific gravity differential of .01-.02 referred to shall be maintained with a current in the separator, upwards or downwards from the level of medium entry, of an order not exceeding 1 mm. per second at the level of medium entry. This requirement calls for a very stable medium. I have found that it can be obtained, and also a desired freedom from segregation of the largest particles, when the following three conditions are observed:

(1) About 100-200 ccs. of medium, when allowed to settle in a glass cylinder of (say) 1″ diameter, should show a settling rate of approximately 5 minutes per cm. for a period of at least 15-20 minutes. In other words, the medium should not settle more than 4 cms. in 20 minutes.

(2) The line between the sediment and the supernatant water or other liquid should be straight and uninterrupted by currents.

(3) Since such media consist of a combination of fine and relatively coarse solids the uniformity of the suspension is broken up, if a medium is unbalanced and the existence of such a state can be ascertained by visual observation. If, in spite of its slow settling rate, the medium is unbalanced, segregation of the largest particles will be apparent. Such segregation is indicated by the downward and upward oscillating motion of particles instead of a uniform settling down of the suspension. It was found that in a suitable medium no such segregation should occur before 20 minutes settling time.

There is a further condition which has a direct bearing on the stability of such suspensions, namely, their viscosity. A medium answering to the above three requirements may easily be prepared but which, however, has a high viscosity, because of its high percentage of extremely fine solids. The detrimental effect of high viscosity of the medium upon accuracy of separation makes it necessary, in my opinion, to specify a viscosity of between 1.1 and 1.25 (taking the viscosity of water as 1.0), for obtaining the best results, and to set an upper limit to the viscosity of 1.4, above which accurate separation becomes increasingly difficult if not impossible. These conditions will be observed in the examples herein given. It will however be understood that permissible limits of viscosity as well as other properties of a medium to be used will vary to some extent in different cases, as, according to the accuracy of separation demanded by particular ore-dressing problems.

The media prepared during the research upon which the present improvements are based were made up, as to their solid phase, in varying proportions, of particle fractions chosen as follows:

(1) Coarse in the range of between 300-500 mesh for which an average of 400 mesh or 44.48 microns was taken.
(2) Intermediate—coarse or "pivot" particles (the term "pivot" will be explained later) between 500-800, average 650 mesh or 26 microns.
(3) Intermediate particles between 800-1500, average 1250 mesh or 14 microns.
(4) Fines—1500 mesh, average 2500 mesh or 7.2 microns.

I have found, as the result of the experiments referred to, that suspensions which contain particles of identical aggregate surface show within wide limits, irrespective of the size and proportions of the fractions of which they are composed, practically identical viscosities and settling characteristics. This is indicated, for example, by a series of tests with a medium made up of galena particles, fractionally composed as above stated, suspended in water; these tests covered a range of solid/water ratios extending from 39/61 to 23/77. This range corresponds to 81.77 weight per cent solids to 67.65 weight per cent solids, or in terms of density, taking the specific gravity of the galena as 7, from D=3.44 to 2.44. The above range covers all practical densities which may occur in ore dressing, it being recalled that gangue densities most commonly met in practice are between 2.94 and 2.69, that is between solid/water ratios of 31/69 and 27/73.

These tests were made with varying percentages of fine, pivot (intermediate-coarse), and coarse particles as above defined, and also with only one, or two, of the above three groups, and in some cases "intermediates" (between 800 and 1500 mesh) were used together with other groups, such as "fines" and "pivots" and "coarse." The results of some of the above tests, grouped to illustrate the conclusions stated above are given in condensed form in the following table:

*Table I*

| 1 | 2 | 3 | 4 | 5 | 6 | 7 | 8 | 9 | 10 | 11 |
|---|---|---|---|---|---|---|---|---|---|---|
| No. of test | S/W ratio | Per cent solids | Density | Ccm. solids | Composition, per cent | Composition, ccm. | Visc. | Surface $m^2$ | Settling rate | Segr. |
| 1 | 37/63 | 80.5 | 3.31 | 11.5 | 23.0 F<br>55.0 P<br>22.0 C | 2.64<br>6.33<br>2.53 | 1.27 | 2.24<br>1.01<br>.34 | 6-5-5-5 | 14-19 |
|  |  |  |  |  |  |  |  | 3.59 |  |  |
| 2 |  |  |  |  | 27.6 F<br>53.0 P<br>19.4 C | 3.17<br>6.10<br>2.23 | 1.28 | 2.69<br>.98<br>.30 | 8-7-7½-6 |  |
|  |  |  |  |  |  |  |  | 3.97 |  |  |

Table I—Continued

| 1 | 2 | 3 | 4 | 5 | 6 | 7 | 8 | 9 | 10 | 11 |
|---|---|---|---|---|---|---|---|---|---|---|
| No. of test | S/W ratio | Per cent solids | Density | Cem. solids | Composition, per cent | Composition, ccm. | Visc. | Surface $m^3$ | Settling rate | Segr. |
| 3 | | | | | 29.0 F<br>42.0 P<br>29.0 C | 3.33<br>4.83<br>3.33 | 1.25 | 2.83<br>.77<br>.45<br>4.05 | 7-6-6-4 | |
| 6 | | | | | 23.2 F<br>24.9 I<br>33.1 P<br>18.8 C | 2.62<br>2.86<br>3.81<br>2.20 | 1.40 | 2.22<br>1.23<br>.61<br>.25<br>4.34 | 7-5-5-5 | |
| 7 | 35/65 | 79.0 | 3.19 | 11.29 | 22.5 F<br>55.5 P<br>22.0 C | 2.54<br>5.27<br>2.50 | 1.17 | 2.16<br>.84<br>.34<br>3.34 | 4¾-4¼-4¾-4 | 4 |
| 8 | | | | | 23.0 F<br>55.0 P<br>22.0 C | 2.60<br>6.21<br>2.48 | 1.20 | 2.21<br>.99<br>.33<br>3.53 | 5-4¾-4½-4 | 17 |
| 9 | | | | | 27.6 F<br>53.0 P<br>19.4 C | 3.12<br>5.98<br>2.19 | 1.20 | 2.65<br>.97<br>.30<br>3.92 | 7-6-6-5 | |
| 10 | | | | | 29.0 F<br>42.0 P<br>29.0 C | 3.27<br>4.74<br>3.27 | 1.18 | 2.78<br>.76<br>.44<br>3.98 | 6½-6-6-5 | |
| 11 | | | | | 29.0 F<br>45.0 P<br>26.0 C | 3.27<br>5.08<br>2.94 | 1.20 | 2.78<br>.81<br>.40<br>3.99 | 6½-5½-5-5 | |
| 12 | | | | | 30.0 F<br>51.0 P<br>19.0 C | 3.39<br>5.76<br>2.15 | 1.23 | 2.88<br>.92<br>.29<br>4.09 | 8-7-6-5 | |
| 13 | | | | | 36.0 F<br>64.0 P | 4.06<br>7.23 | 1.36 | 3.45<br>1.16<br>4.61 | 11-10-7-5½ | |
| 14 | 33/67 | 77.5 | 3.06 | 11.07 | 27.6 F<br>53.0 P<br>19.4 C | 3.06<br>5.87<br>2.15 | 1.11 | 2.60<br>.94<br>.29<br>3.83 | 4¾-4½-4-5 | 16 |
| 15 | | | | | 29.0 F<br>45.0 P<br>26.0 C | 3.21<br>4.98<br>2.88 | 1.12 | 2.73<br>.80<br>.39<br>3.92 | 5-5-4-4 | 16-21 |
| 16 | | | | | 29.0 F<br>42.0 P<br>29.0 C | 3.21<br>4.65<br>3.21 | 1.12 | 2.73<br>.74<br>.44<br>3.91 | 5-4½-4½-4½ | 17-20 |
| 17 | | | | | 30.0 F<br>51.0 P<br>19.0 C | 3.30<br>5.64<br>2.10 | 1.13 | 2.80<br>.90<br>.28<br>3.98 | 5-4¾-4¾-4½ | 12-19 |
| 18 | | | | | 33.3 F<br>30.3 P<br>36.4 C | 3.69<br>3.35<br>4.03 | 1.14 | 3.14<br>.54<br>.54<br>4.22 | 6-5-5½-5 | 10-16 |
| 19 | | | | | 34.5 F<br>41.0 P<br>24.5 C | 3.82<br>4.54<br>2.71 | 1.14 | 3.25<br>.73<br>.37<br>4.35 | 7-6½-6½-6½ | |
| 20 | | | | | 36.0 F<br>29.0 P<br>35.0 C | 3.99<br>3.21<br>3.87 | 1.16 | 3.40<br>.51<br>.52<br>4.43 | 7-7-7-6 | |
| 21 | 31/69 | 75.9 | 2.94 | 10.84 | 27.6 F<br>53.0 P<br>19.4 C | 3.00<br>5.74<br>2.10 | 1.3 | 2.55<br>.92<br>.28<br>3.75 | 4-4-4-4 | 9 |

Table I—Continued

| 1 | 2 | 3 | 4 | 5 | 6 | 7 | 8 | 9 | 10 | 11 |
|---|---|---|---|---|---|---|---|---|---|---|
| No. of test | S/W ratio | Per cent solids | Density | Ccm. solids | Composition per cent | Composition, ccm. | Visc. | Surface m² | Settling rate | Segr. |
| 22 | | | | | 33.0 F<br>34.0 P<br>33.0 C | 3.57<br>3.68<br>3.57 | 1.12 | 4.13<br>3.03<br>.60<br>.50 | 5-5-5-4½ | 12-14 |
| 26 | | | | | 52.2 F<br>47.8 P | 5.69<br>5.18 | 1.40 | 5.67<br>4.84<br>.83 | 22-20-etc. | |
| 27 | 29/71 | 74.10 | 2.81 | 10.6 | 33.3 F<br>30.3 P<br>36.4 C | 3.53<br>3.21<br>3.85 | 1.09 | 4.03<br>3.00<br>.51<br>.52 | 5-5-4½-4 | 13-15 |
| 28 | | | | | 34.5 F<br>41.0 P<br>24.5 C | 3.66<br>4.35<br>2.60 | 1.07 | 4.16<br>3.11<br>.70<br>.35 | 5-5¾-5½-5 | 14-16 |
| 29 | | | | | 36.0 F<br>29.0 P<br>35.0 C | 3.81<br>3.10<br>3.71 | 1.09 | 4.25<br>3.24<br>.50<br>.51 | 5¾-6-5½-5 | 14-16 |
| 30 | | | | | 37.5 F<br>62.5 P | 3.98<br>6.63 | 1.16 | 4.44<br>3.38<br>1.06 | 10-9-etc. | |
| 31 | | | | | 31.5 F<br>24.0 I<br>44.5 P | 3.34<br>2.54<br>4.72 | 1.14 | 4.62<br>2.83<br>1.09<br>.70 | 5½-4¾-4¾-4½ | |
| 32 | | | | | 42.0 F<br>29.0 P<br>29.0 C | 4.45<br>3.07<br>3.07 | 1.12 | 4.68<br>3.78<br>.49<br>.41 | 6-6¾-7 | |
| 33 | | | | | 44.2 F<br>15.6 I<br>40.2 P | 4.68<br>1.65<br>4.26 | 1.30 | 5.32<br>3.98<br>.66<br>.68 | 10-6½-5½ | |
| 35 | 27/73 | 72.15 | 2.69 | 10.3 | 45.7 F<br>10.3 P | 4.71<br>5.60 | 1.21 | 4.90<br>4.00<br>.90 | 14-11-10 | |
| 36 | | | | | 100.0 F | 10.30 | 1.34 | 8.75 | 25-15-15-etc. | |
| 37 | 26/74 | 71.1 | 2.62 | 10.16 | 45.7 F<br>54.3 P | 4.64<br>5.52 | 1.16 | 4.82<br>3.94<br>.88 | 12½-11-etc. | |
| 38 | 25/75 | 70.0 | 2.56 | 10.0 | 45.7 F<br>54.3 P | 4.57<br>5.43 | 1.14 | 4.75<br>3.88<br>.87 | 12-10-etc. | |
| 39 | | | | | 100 F | 10.0 | 1.24 | 8.50 | 25-12½-13-etc. | |
| 40 | 23/77 | 67.65 | 2.44 | 9.66 | 100 F | 9.66 | 1.16 | 8.21 | 22-20-15-etc. | |

In the above table column 2 gives the solid/water ratios which are otherwise expressed as percentages of solids given in column 3, producing the densities given in column 4. Column 5 gives the total volume of solids in cubic centimetres suspended in 100 grammes of medium in each instance. Column 6 gives the fractional percentage composition in each test here summarized F, I, P, and C standing for fine, intermediate pivot, and coarse particles, while column 7 expresses in cubic centimetres the volumes of solids for the different size fractions the relative percentages of which are specified in column 6, the volumes in column 7 adding up to the total given in column 5 in each instance. Column 8 gives the viscosities as ascertained in each test.

The viscosity referred to above is determined by dividing the number of seconds required for 50 ccs. of medium to pass through the orifice of the viscometer by the number of seconds taken for the same quantity of water.

Column 9 shows the surface area for each individual fraction and also the aggregate in square metres and the figures are calculated from the volumina in column 7 by multiplying the number of ccs. by the total surface of 1 cc. solids when comminuted to the specified average mesh characteristic for the relative fraction. The surface of 1 cc. solids (assuming that the particles are cubes) when comminuted to 400, 650, 1250 and 2500 mesh (which figures are calculated to be the averages of the chosen size ranges) will be as follows:

400 mesh=44.48 microns mean particle diameter=1350 sq. cm. per cc. (or ml.) solids.
650 mesh=26 microns mean particle diameter=1600 sq. cm. per cc. (or ml.) solids.
1250 mesh=14 microns mean particle diameter=4300 sq. cm. per cc. (or ml.) solids.
2500 mesh=7.2 microns mean particle diameter=8500 sq. cm. per cc. (or ml.) solids.

The values given in column 9 may not be absolutely correct, but are believed to be reasonably accurate.

Column 10 shows the settling rate in minutes per cm. recorded, that is, the four figures in each instance, indicate the number of minutes for the first four cm. of settling.

If no entry is made in column 11 this indicates that no segregation was observed during the first 20 mins. of the settling test. Otherwise the time is recorded when segregation appeared and when it became bad.

It will be seen from the above table that the two tests for instance, numbers 2 and 3 have aggregate surface areas (column 9) which are very nearly the same, and that the viscosities and settling characteristics are, for practical purposes, the same, despite the fact that the proportionate composition has varied in the four tests to a considerable extent, as is indicated. The same fact is seen to be true from consideration of tests 9 to 12; tests 14, 15, 16, and 17; tests 18, 19 and 20; tests 30, 31, 32, tests 29, 30, 32 etc. The examples show that even in the same solid/water ratio range wide variations in size and proportion of fractions are permissible without any material interference with the viscosity and settling rate. From the whole series of tests referred to the fact emerges that a galena medium may contain anything from 0 to 36 per cent of coarse particles, (examples 26, 30, 35, 37—18, 20, 27) or from 22% to 100% of fines, (examples 1, 7, 8—36, 39, 40) or up to substantial percentages of intermediates (examples 6, 31, 33) so long as the total surface of the particles is within a range predetermined to be correct for any chosen density. The same principles apply where media other than the galena medium referred to above are used, as will be explained hereafter.

It should be noted that, in practice, it is not necessary to calculate the aggregate surface area by calculating and adding together the surface areas of the various fractions, as indicated above. Much simpler methods of ascertaining the aggregate area are available, as is explained hereafter.

Other principles may be deduced from the tests, of considerable practical value, the correctness of which is confirmed by a considerable number of experiments. One of these is that minimum and maximum aggregate surfaces per unit of weight of the medium may be established for each density, the minimum (S min.) being the lowest aggregate surface area required for producing a specified stability, while the maximum (S max.) is the aggregate surface which cannot be exceeded without increasing the viscosity beyond a figure which has been predetermined as the maximum permissible. The difference between these two surface values (which I will term the "gap") determines the practical range within which desired settling characteristics will be obtained, while viscosity increases from the minimum to the maximum. It may also be noted that the relation between the aggregate surface area of the suspended particles and the density of the medium is established, apparently for the first time. While no discrimination seems to have been indicated in the prior art as to the preparation of media for high or for low densities, it may now be said that the properties of a medium of a given density depend on the aggregate surface area of the particles suspended therein, while conversely the surface area of the particles in a medium having certain characteristics is a function of the density (or solid to liquid ratio) of the medium in which they are suspended.

Further, the minimum and maximum surface values in the various solid/water (or density) ranges seem to be in strict mathematical relation to each other and can be calculated by a formula, deduced from the test results, and plotted accordingly on graph paper, as will presently be explained.

The following points are also noted. The "gap" is comparatively slight where the percentage of solids exceeds 79% (i. e. in the solid/water range above 35/65), but the maximum surface values diverge with increasing rapidity from the minimum values as the percentages of solids in the medium decrease, so that the "gap" is considerable at lower density ranges, such as 74% to 72% of solids.

In addition to the above principles, a certain balance between comparatively coarse and fine particles is required to prevent segregation or precipitation of coarse particles, as will presently be explained.

Figure 1:
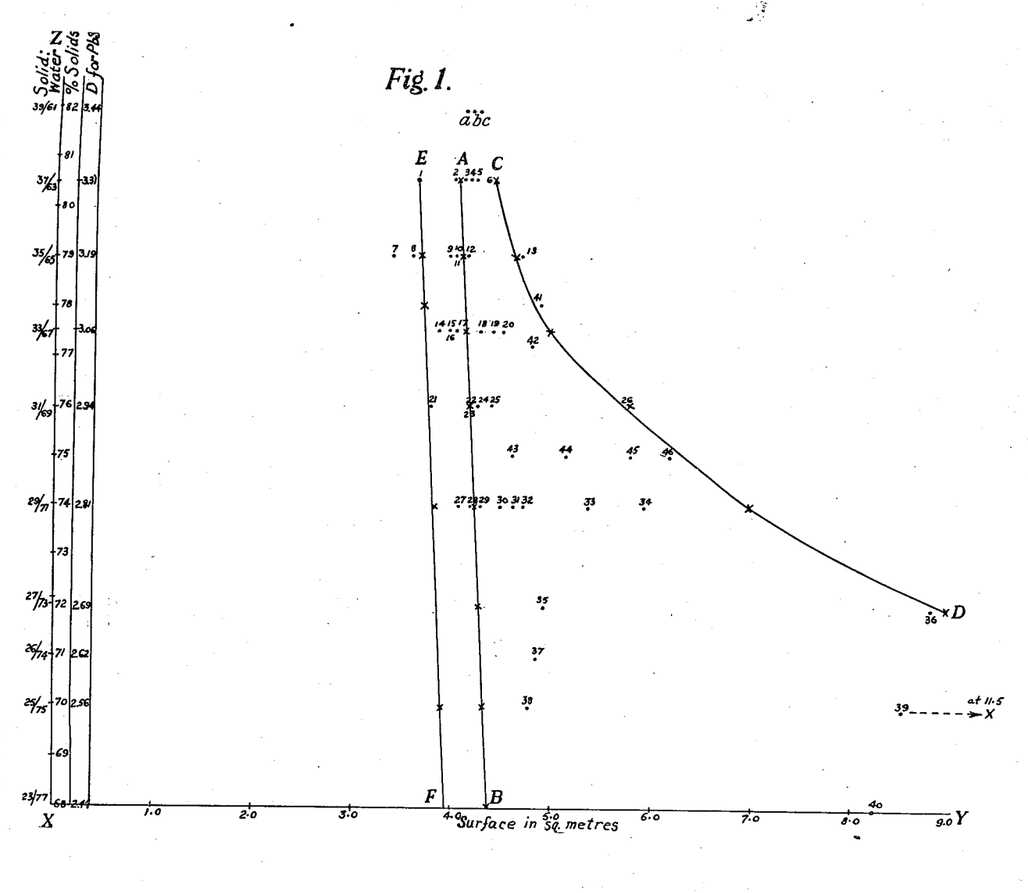
Fig. 1 is a graph showing minimum and maximum aggregate surface values of suspended solids, per unit of volume, for a range of media densities, between which specified desired medium characteristics will be obtained.

The above description may be more readily understood from consideration of Fig. 1. This is a graph based partly upon theoretical considerations, deduced from the results of tests, upon which are indicated the positions obtained in actual tests, both the tests conducted with the galena medium referred to above and another series of tests with an arseno-pyrite medium. In this diagram the horizontal axis X—Y represents aggregate surface areas in square metres of solids suspended in 100 grammes of medium, while the vertical axis X—Z indicates, on the left, solid/water ratios in the middle percentages of solids in the media and densities, on the right. The line A—B represents minimum aggregate surface area values (S min.) while C—D represents the maximum aggregate surface area values (S max.) it being understood that this graph is made in accordance with the predetermined medium characteristics assumed in the tests, in which a maximum tolerated viscosity of 1.40 (between 1.1 and 1.25 for optimum conditions) and the settling conditions previously described are prescribed. The crosses on the S min. and S max. curves which are not numbered (and also on the "S crit." line, E—F presently to be described), are derived from formulae, as will be described, while the numbered dots or points represent the results of tests as described, the numbers being those given to different tests.

The reference numbers 1–40 inclusive refer to tests described in Table I above, while numbers 41–46 inclusive refer to tests with an arseno-pyrite medium, described in Table II, referred to later.

It will be seen that the graph shows the calculated and also theoretical values for S max. and S min. for densities between 3.31 and 2.44, corresponding to solid/water ratios of 37/63 and 23/77 respectively. It also shows a line E—F, parallel to line A—B and to the left thereof, which I term the "critical-surface" line, (S crit.). The area between lines E—F and A—B represents the range of media which fail only slightly to produce the specified settling rate or segregation characteristics; that is to say, if somewhat less stringent characteristics were prescribed the line E—F could be considered as the minimum surface line, and the inclusion of media whose positions are located between lines E—F and A—B in the range of media considered practically workable increases the "gap" somewhat without undue detriment to the stability of the medium. Media to the left of or on the line E—F, such as examples 7, 8, 21, show characteristics which render them unsuitable for the desired purpose.

It will accordingly be clear that media which approach very nearly the minimum requirements will be represented by positions between lines E—F and A—B and will have aggregate surface areas of their solids corresponding to the values plotted along the horizontal ordinate X—Y, at distances from the vertical axis X—Z corresponding to such positions; that media represented by positions between lines A—B and C—D are within the specified requirements, and that points on the S max. curve, C—D, have viscosities close to but not exceeding the maximum permissible. It follows that if a particular medium is prepared, whose characteristics place it on or close to the S min. line, it may be permitted to increase its surface in service in the sink-and-float process (as it tends to do, because of various causes), until it has increased in viscosity to about 1.4, thus placing it on the S max. line. Thus for example the medium shown by point 23 having aggregate surface of 4.12 and viscosity of 1.14 could be permitted to increase in surface to 5.67 and in viscosity to 1.40, the density remaining at 2.94, as shown by point 26 on the graph, without requiring renewal, and the approach of the danger line can be determined by determination of the aggregate surface area. The viscosities of media whose positions may be plotted at any points between the S max. and S min. (or S crit.) lines, will vary more or less in accordance with their proportionate positions between those lines.

It will be noted that three media were prepared in the solid/water ratio of 39/61 (density 3.44) as indicated by the positions $a$, $b$ and $c$, at the top of the graph, but in no case was a lower viscosity than 1.5 obtainable, thus showing that in this density range the suspension is too crowded to permit a medium of the desired viscosity range being obtainable, even in spite of cutting down the stability to the lowest permissible limit. If, of course, a lesser degree of stability or greater degree of segregation is permitted it will be possible to prepare less viscous media even in that density range, but such deviation from the specified stability would cause the disadvantages, such as increased density differential from the top to the bottom of the separator, described in the early part of this specification. Whether such departures from the strict requirements laid down in respect to the tests herein described are permissible in any case will depend on the nature of the ore or other material to be separated, i. e., on the accuracy of separation required for segregating the tailings, middlings and concentrates respectively.

For the sake of accuracy, note should also be made of the details of the tests conducted with an arseno-pyrite medium, tests numbered 41 to 46 of which are plotted on the graph, Fig. 1. The solids used in these tests have a specific gravity of approximately 6. The fractions used in the particular tests recorded were not isolated quite as efficiently as in the galena tests, but accuracy obtained was sufficient to show that media in which arseno-pyrite is suspended answer to the same principles as have been explained above, although the respective solid/water ratios correspond to different media densities.

Considering the mesh analysis of the products the average surfaces of the fractions were determined as follows:

```
                                              Sq. cm.
Coarse (combined coarse and pivot)______ Average 1,400
Intermediates __________________________ Average 4,000
Fines __________________________________ Average 8,200
```

The results of some of these tests are summarised herein as Table II.

Table II

| 1<br>No. of test | 2<br>S/W ratio | 3<br>Per cent solids | 4<br>Density | 5<br>Ccm. solids | 6<br>Composition, per cent | 7<br>Composition, ccm. | 8<br>Visc. | 9<br>Surface $m^2$ | 10<br>Settling rate | 11<br>Segr. |
|---|---|---|---|---|---|---|---|---|---|---|
| 41 | 37/63 | 78.0 | 2.85 | 13.0 | 28.2 F<br>11.4 I<br>35.3 P<br>25.0 C | 3.67<br>1.48<br>7.85 | 1.36 | 3.00<br>.60<br>1.18<br>4.78 | 11-8½-7¾-7 | |
| 42 | 36/64 | 77.24 | 2.80 | 12.87 | 28.2 F<br>11.4 I<br>35.3 P<br>25.0 C | 3.63<br>1.47<br>7.78 | 1.31 | 2.98<br>.60<br>1.09<br>4.67 | 10-7¾-7½-6¾ | |
| 43 | 33.4/66.6 | 75.0 | 2.67 | 12.5 | 28.3 E<br>11.4 I<br>35.3 P<br>24.5 C | 3.54<br>1.43<br>7.54 | 1.17 | 2.90<br>.57<br>1.06<br>4.53 | 6-6-6-5½ | |
| 44 | | | | | 37.5 F<br>5.0 I<br>31.2 P<br>25.7 C | 4.69<br>.63<br>7.18 | 1.19 | 3.84<br>.25<br>1.01<br>5.10 | 10¾-9-8-8 | |
| 45 | | | | | 46.0 F<br>3.3 I<br>19.7 P<br>32.0 C | 5.75<br>.41<br>6.34 | 1.24 | 4.71<br>.16<br>.89<br>5.76 | 14½-10½-9-7½ | |
| 46 | | | | | 50.5 F<br>3.4 I<br>17.9 P<br>28.2 C | 6.31<br>.40<br>5.8 | 1.32 | 5.17<br>.16<br>.81<br>6.14 | 20-14-9¾-7 | |

The formulae for calculating S min. and S max. will now be explained. It follows from the explanation previously given that, in order to obtain identical stability when the solid/water ratio is decreased, the aggregate surface of the particles has to be increased. The relations are, however, quite different in the cases of S min. and S max. To obtain a minimum stability it appears to be sufficient to increase the aggregate surface in indirect proportion to the decrease in the volume of solids contained in 100 grammes of the medium. The following formula, which is in practical accordance with a large number of experimental results, is accordingly derived:

$$S \text{ min.} = 4.00 + \left(\frac{11.5 - V}{11.5}\right) \times 4$$

In the above the volumes and surfaces of the 37:63 solid:water ratio composition, which contains 80.5 weight per cent or 11.5 ccs. solids in 100 grammes of medium are taken as the basic value, or 0, from which the relative figures referring to lower solid/water ratio media are calculated by the equation. Accordingly, the 4.00 in the equation represents the minimum surface in square metres (as noted from the horizontal ordinate X—Y), per 100 grammes of medium at the basic solid/water ratio, at which the volume is 11.5 ccs., as stated, and V represents the volume of solids, in cubic centimetres per 100 grammes of medium at any solid/water ratio for which the minimum aggregate surface is to be determined.

Obviously, the above formula may be generalized to read $$S \text{ min.} = S^c + \left(\frac{V^c - V}{V^c}\right) \times S^c$$

in which $S^c$ and $V^c$ are constants, $S^c$ being the aggregate surface area of particles suspended in a medium of prescribed minimum settling rate and prescribed minimum viscosity, said medium having the highest solid to liquid ratio, and therefore highest density, which is expected to be required for a series of operations, in square metres per 100 grammes of medium, while $V^c$ is the volume of solids of the said medium of highest density, and V is, as before noted, the volume of solids in a medium at any solid to water ratio for which the minimum surface is to be determined, $V^c$ and V being in cubic centimetres per 100 grammes of medium. $S^c$ and $V^c$ may be determined after the said medium of highest density, having the desired characteristics, has been prepared experimentally. It is noted that it is immaterial in practising this invention whether the aggregate surface areas of particles be computed per unit of volume or per unit of weight of the medium, since either ratio can readily be converted into the other.

If, on the other hand, S max., is to be calculated, i. e. the maximum aggregate surface which can be congested in 100 grammes of medium, the issue boils down to determining the maximum packing space of comminuted particles at the specified maximum viscosity of (say) 1.4. If the particles of such a vast aggregate surface are packed into such a limited space their movements finally counteract each other, the medium loses its fluidity and becomes too viscous. Thus the state of arriving at S max. coincides with the maximum packing space available in 100 grammes of medium. It was found that the figure expressing S max. is in indirect proportion to the square of decrease in the volume and this relation is borne out by the following equation:

$$S \text{ max.} = 4.35 + \left[\left(\frac{11.5 - V}{11.5}\right) \times 100\right]^2 \times \frac{4.35}{100}$$

In the above formula the 37:63 solid/water composition is again taken as 0, V again represents the volume of solids at the solid/water ratio for which the maximum surface is to be determined, and the constant 4.35 represents the maximum surface in square metres at the basic solid/water ratio.

The above formula for S max. may be generalized to read:

$$S \text{ max.} = S^m + \left[\left(\frac{V^c - V}{V^c}\right) \times 100\right]^2 \times \frac{S^m}{100}$$

in which $S^m$ is the aggregate surface area of particles suspended in the medium of highest density, of a settling rate at least as slow as the prescribed settling rate, and the maximum prescribed (or permitted) viscosity, which can be determined after such medium of highest density and maximum permitted viscosity has been experimentally produced, the definition of the other symbols being the same as above noted. As has been previously noted, the settling rate actually becomes slower, and therefore more favorable, as the viscosity increases, between the S min. and S max. lines.

The implications of the "gap" between the minimum and maximum surface values, for practical operation, will now be discussed. As stated above, the density range covered by the graph, extending from 2.44 to 3.31, includes the practical range of from 2.69 to 2.94 generally used for eliminating gangue of non-ferrous or non-metallic minerals. As to this latter range it is apparent that even at the higher density figure, 2.94, the "gap" is still substantial and amounts roughly to 2 square metres latitude, (that is, considering the "S crit." line E—F, not the "S min." line A—B, as marking the lowest permissible values), whereas in the lower density range. i. e., 2.69, it amounts to as much as 4¾ square metres. In other words, the solids suspended in the 2.69 density medium may increase their surface by more than 100% from 4 to almost 9 square metres without becoming more viscous than 1.4, while in the density range of 2.94 the total surface may increase from 3.75 square metres to 5.6 square metres without overstepping the viscosity mark of 1.4. This analysis of the experimental results shows that in these practical density ranges there is a considerable elasticity or latitude within which alterations in the composition of the medium and in the effective aggregate area of its solids do not materially affect its suitability. It therefore follows that, provided that the initial medium stock has the lowest possible viscosity, approaching that of S critical, only a modest rate of withdrawal of medium for reconditioning will be necessary to control the increase towards the maximum permitted viscosity figure. Even an increase in the aggregate surface area of 25 or even 50% of the initial surface will not increase the viscosity of such media beyond 1.2 to 1.25, which is well within the practically usable range.

The "gap" narrows rapidly in the density range above 2.94; so in the range of 3.19, for instance, the whole gap is not more than 1 sq. metre, i. e., even slight variations in the aggregate surface area will be responsible for an immediate and sharp increase of viscosity. This becomes even more apparent if we have to adhere to the S min.

line. In this case the "gap" is not more than .5 sq. m. and narrows down to ⅓ sq. m. in the density range of 3.31.

It is evident from the foregoing that, whereas in the density ranges of 2.69 to 2.91 fairly wide variations in medium composition are tolerable, in the higher density ranges very strict control of the total aggregate surface becomes imperative. The reconditioning circuit (described hereafter) has therefore to be operated very delicately in the higher density ranges in order to maintain the aggregate surface as close to the S critical or S minimum line as possible.

It will be apparent from all of the above that the principles described may be applied to practical use. broadly speaking, by adjusting a grinder-classifier combination to produce particles within a suitable size range of a material suitable for a desired operation, so as to give a desired aggregate surface area of solids per unit of medium, determined from a chart or from experimental results; this can be readily done and the result determined by simple tests. A certain balance of particle sizes produced will also be required, as will presently be explained. The desired medium then having been prepared as a suspension at the required solid/water ratio and put to use, it is only necessary to so maintain it as to prevent the aggregate surface area of the solids exceeding the determined maximum for the density which is used.

Some further preliminary explanations must be made before the details of the operating process are described. It may be advisable first to refer to theoretical considerations which may tend to throw light on the aggregate surface principles herein set forth. Various theories have been put forward to explain the reasons why such vast numbers of solid particles as are referred to herein can be kept in suspension and apparently to some degree defy the laws of gravity. One of these theories, for the truth of which considerable evidence exists, is that the suspended particles carry electrical charges of the same sign, so that they repel each other. This mutual repulsion causes the particles to be kept in constant motion, thus retarding their settling out. The intensity of such electrical charges and the consequent kinetic action must necessarily depend on the effective surfaces and the proximity of the particles to each other. Hence in a suspension which contains a smaller number of particles of the same size fraction (i. e., where the solid/water ratio and the density are less) than in another case, a lesser degree of stability will be obtained. In order to bring the stability of the first case up to that of the second, the number of particles, and hence the total surface, has to be increased. In other words, the particles require a certain degree of tight packing in the available space in order to be kept in uniform suspension. After a period a certain amount of settling out occurs, which ceases when a fresh equilibrium is attained, this occurring when the particles remaining in suspension have, apparently, formed a more tightly packed body.

The term "segregation," referred to above as something different from the settling rate proper, is a specific characteristic of every suspension. It may be considered as referreing to the preferential release of the coarsest components from the kinetic equilibrium referred to above, such segregation being easily perceptible by the eye. It may be promoted by the phenomenon that the mutual repulsion of suspended solids causes the smaller particles to move outwards towards the sides of the container.

Whatever the truth of the above theories, the facts herein stated, that the stability, segregation characteristics and viscosity of the media are primarily dependent on the aggregate surface area of the suspended solid particles, were established by actual tests. This is true regardless of the proportions of individual size fractions, so long as there is a certain balance between coarse and fine particles. As to this requirement, and as to certain refinements which, if fully observed, will result in a still more accurate control of the required conditions of the media, the following observations should be noted:

The finest particles having the largest surface and hence providing the carrying capacity for the coarser particles, are responsible for keeping the latter in suspension. It follows from the nature of such equilibrium, however, that if a certain mark is overstepped the system of fines coarse becomes unbalanced and that portion of the coarse particles which cannot be maintained in suspension will precipitate in form of a segregating sediment. It was found that (1) A perfect balance can be maintained as long as the percentage of coarse, i. e. between 300 and 500 mesh, does not exceed the percentage of fines.

(2) The percentage of fines must not be less than 22%. In no case did I succeed in preparing media which contained less than 22% fines of the specified size range or, in general terms, the aggregate surface of the carrying particles must be in excess of 70–75% of the total surface of all solids.

(3) The intermediate-coarse particles, i. e. between 500 and 800 mesh behave in every respect like the coarsest fraction and the latter can be conveniently replaced within any proportion by the same percentage of 500–800 mesh solids, which fraction is referred to, for sake of convenience, as "pivot" expressing that the balancing of varying percentages of fines and "coarse" takes place round this pivot which has very little influence on the nature of the medium. The viscosity of the suspension hardly alters by using, for example, "pivot" material instead of a certain proportion of coarse. This is a further important finding since it permits the use of unspecified coarse particles extending over the full range of 300–800 mesh, as long as the 300–500 mesh portion does not exceed the fines percentage.

Reference to the following examples shown in Table I, illustrate the above observations.

Example 7 shows marked segregation at 22.5% fines balancing 22% coarse; in the same density range (example 8) 23% fines completely balance 22% coarse and this fact is fully borne out by the respective segregation rates, i. e. 4 versus 17 minutes. Similarly in example 10 where 29% fines almost completely balance the equal percentage of coarse, slight segregation occurs only after 20 minutes. Conversely, as shown in example 18, 33.3% fines balancing 36% coarse leads to segregation after ten minutes which becomes markedly complete after 16 minutes, although the settling rate as recorded in column 10 was satisfactory, in compliance with the surface values being near the S.min. line.

Examples illustrating the substitution of intermediate and coarse by pivot particles are 32 and 30 respectively.

In preparing several media which consisted of intermediate only it was found that this fraction was virtually self-supporting and in the solid/water range of 31/69, for instance, the suspension exclusively consisting of these solids has shown the specified settling rate without segregation at a viscosity of 1.40 and a corresponding aggregate surface area of 4.70, i. e. near to the S. max. figure of that range. It follows, therefore, that within limits the intermediates are just self-supporting, but it also follows that they cannot give great buoyancy to the coarser fractions and are therefore useless in this respect. Thus the role of intermediate particles is very restricted.

It will be observed that in the examples shown in Tables I and II I have chosen the particle ranges so as to obtain a division according to supporting (—1500 mesh), just self-supporting (+800—1500 mesh) and supported (300–800) fractions. Although no clear-cut discrimination is possible, this classification is not entirely arbitrary and in referring above to the desirable surface proportions between supporting and supported particles or to the self-supporting phenomenon of intermediates, it should be understood that, in general, those particles are to be considered as being supporting ones which can keep in non-segregating suspension coarser particles at the specified stability. Self-supporting fractions, on the other hand, are those which do not need to be supported by fines, but nevertheless cannot support appreciable quantities of coarser sizes. Their presence can therefore be disregarded in establishing the equilibrium between supporting and supported particles, i. e. the surface area of the former should amount to about 70–75% of the total supporting and supported areas, taking the fines, pivot and coarse particles as 100.

The initial medium stock is prepared, in the light of the principles set forth herein, by regulating the performance of a grinder-classifier circuit (preferably a well-known ball-mill classifier combination) so as to obtain directly from these machines a medium which is serviceable without further treatment. The process is thereby a simple and cheap one, in which no wastage of any fractions of particles takes place. As has been explained, the method does not call for rigid observance of proportions between the various particle size fractions, and as long as the total surface of the particles suspended in the pulp comes within the specified limits, preferably being close to the values of S min., the proportions of the various fractions may be almost disregarded, so long as there is a sufficient balance to prevent segregation. The grinding characteristics of the solids to be used should be studied and, the ball mill and classifier can then easily be set to produce a pulp which will possess such optimum characteristics.

The preparation of medium of a required density therefore comprises the following steps: the permissible viscosity range, settling rate and segregation characteristics for the particular work in hand are determined, or are assumed as conditions if previously determined, and the minimum and maximum aggregate surface areas of particles of a desired solid material, at the solid to fluid ratio for the required density, computed or determined, to produce the required charactertistics. (This may be done very simply by a junior laboratory assistant, as will be explained further, hereafter.) The ball mill and classifier are then set to produce the required surface characteristics, by producing particles within a determined size range (which as assumed herein may be from 300 mesh to —1500 mesh, the upper limit being subject to some variation in accordance with determined characteristics of the medium. If the requirements are less rigid than assumed herein, the coarse particles may be somewhat larger if desired). The surface characteristics of the particles produced being determined as satisfactory, it must also be determined whether the balance of the particle sizes is satisfactory. This can be done, generally speaking, by seeing whether the percentages produced are within the suitable limits, as described, or it can be done by making a suspension of the required density of the particles produced, in water, and testing it for segregation and, if undue segregation occurs, decreasing the proportion of coarsest particles until such segregation ceases to occur. The desired medium as finally determined may then be prepared and supplied to the feed circuit for the separator tank.

The determination of the aggregate surface area of the solid particles introduces in the sink and float separation technique a new procedure which however—used for different purposes in other industries—became perfected and an extensively used method. For the purpose referred to herein the sedimentation method is preferred and particular reference is directed to the following publications on this subject which contain a full description of the apparatus and method recommended and also the simple mathematical evaluation of the readings by means of charts:

1. F. C. Bond: The sedimentation balance for measurement of size distribution of fine materials. Mining Technology November 1939, A. I. M. M. Technical Publication 1129.
2. A. J. Weinig: A functional size-analysis of ore grinds. Colorado School of Mines Quarterly (July 1933).
3. F. C. Bond and W. L. Maxson: Grindability and grinding characteristics of ores. Trans. A. I. M. E. (1939) 134, 296.
4. A. M. Gaudin: An investigation of crushing phenomena, Trans. A. I. M. E. (1926) 73, 253.

Other equally suitable methods may be found in the book entitled "Measurement of the Fineness of Powdered Materials" by Harold Heywood, published by the Institution of Mechanical Engineers, December, 1938, Storey's Gate, St. James's Park, London, S. W. 1. notably that of Professor Andreasen as described on page 279 of that book.

It will be seen that the results of experiments such as those described herein and shown on the graph, Fig. 1, will enable the operator to produce from solids of a given density a medium of the highest possible density obtainable at the specified settling rate, segregation rate, and viscosity. Hence the effective density range of a certain solid substance will be increased, so that the employment of comparatively low density solids for the preparation of high density media will be possible. A specific example is the use of arsenopyrite, having a density somewhat below 6, for the preparation of a medium of 2.80 to 2.85 density at workable viscosities and good stability. Since the quoted densities are within the range of conventional gangue components of minerals, the skilful handling of arseno-pyrite in accordance with the practice described herein enables the employment of this cheap and readily available mineral, which in many cases is actually a waste product from ore concentration. Apart from its low initial cost, the employment of such a cheap substance has further advantages in respect of costs resulting from medium losses and costs of operating the medium circuit, which latter naturally need not be as elaborate as those required for complete recovery of more valuable solids.

As has been above explained, also, the described process enables the operator to prepare a medium from a selected solid material which will show a considerably larger "gap" between the aggregate surface area of such medium as prepared and the maximum aggregate surface permissible, at the required density, than would be possible otherwise, with the advantages that have previously been explained. In this connection the question must be considered whether an open or a closed medium circuit is employed. In the former case, i. e. where the medium is withdrawn from the circuit and passes directly to the flotation plant producing market concentrates, the operator has more freedom of choice and need not exercise as much care as would be the case with a closed circuit. With the open circuit it is only necessary to ensure that the pulp coming from the ball-mill-classifier circuit has a total surface area between the minimum and maximum limits (preferably in the neighbourhood of S min. so as to ensure the lowest possible working viscosity), and that the coarse and fine fractions should be in equilibrium. The open medium circuit may be looked upon as a transitory stage of concentrate production, and if, by proper setting of the ball-mill-classifier circuit alone, without any intentional classification and proportioning of particle sizes, a serviceable medium is obtained directly, this should be an advantage.

In the case of the closed circuit, i. e., where the medium is perpetually returned the provision of a total particle surface area in the neighbourhood of S. min. will ensure the existence of a large "gap," and therefore a less intensive cycle of medium withdrawal from the feed circuit for the purpose of re-cleaning and re-conditioning than would otherwise be the case. As a consequence lower medium losses and lower re-cleaning and re-conditioning costs will result.

The maintenance of the medium in good serviceable condition, in sink-and-float separation, must now be described. Simplification of plant, decreased expense, and efficient and controlled maintenance of the medium in operation are provided by the methods which will now be explained.

The maintenance of rejuvenation of the medium is largely a matter of viscosity and stability-control. It should be borne in mind that the viscosity of any initially low viscosity medium increases during operation on account of (a) slimes adhering to the run-of-mine ore, if such slimes are not washed off completely prior to feeding to the sink-and-float plant; (b) attrition of the gangue constituents of the feed during passage through the separator; (c) attrition of the minerals (mostly friable sulphides) of the feed during passage through the separator; and (d) disintegration of the solid phase of the medium.

To control the viscosity and stability within the permissible limits, two means of adjustment are provided for, namely, re-cleaning and re-conditioning. Re-cleaning may be carried out by the known means, generally by flotation, to remove the contaminations listed under (a) and (b) above, this effecting the restoration of the original density of the solids which form the suspension. The decrease in the specific gravity of the solids by admixture of lower gravity solids, such as clayey slimes or disintegrated quartz or limestone, is directly responsible for an increase in viscosity, since, in order to maintain the density at the desired figure, a larger percentage of lower density solids has to be suspended, this inevitably leading to a smaller "gap," corresponding to the higher solid-water ratio and ultimately, to an increase in viscosity.

"Re-conditioning" is the term describing the re-adjustment of the characteristics of the medium, particularly viscosity, and/or segregation to correct harmful changes due to the causes listed under (c) and (d) above, these effecting variations in the size composition of the mineral particles in the suspension. It can be achieved, generally speaking, by removing a portion or portions, such as one or more size fractions, from the solids, or, on the other hand, there may be a continuous withdrawal of a proportion of the total solids without making any distinction between the fractions withdrawn, the withdrawn medium being replaced in both cases by a suitably composed fresh supply. The method herein described provides for re-cleaning and re-conditioning in a simple and readily controlled manner, and with a minimum of operation of both the re-cleaning and the re-conditioning agencies. Very briefly, the preferred technique is to re-clean and re-condition at rates which are determined as the minima required in the particular cases, in such manner as to re-establish the aggregate surface area of the solids in suspension approximately at the figure indicated by S. min. in each instance, the re-conditioning, in most cases, being effected by a continuous withdrawal of a determined proportion of the total solids, including all size fractions, and making up for the withdrawn medium by supplying fresh medium stock suitably composed as to size fractions, and as to aggregate surface area.

Figure 2:
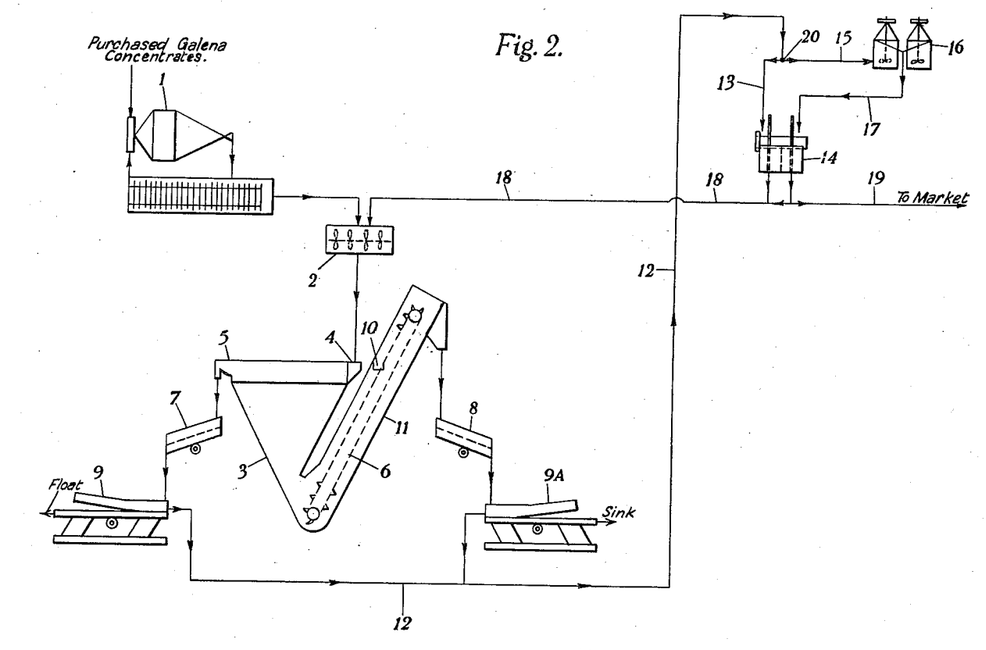
Fig. 2 is a medium re-cleaning and re-conditioning circuit diagram for a closed medium feed circuit.

The method of medium reclamation may be described in connection with the diagram, Fig. 2, in which medium stock from the ball mill-classifier combination 1 passes to the re-pulper 2, from which it passes as medium feed of the desired density into the separator cone or vessel 3, as is indicated at 4. The float particles removed over the boom 5, of the separator and the sink particles removed from the bottom of the separator by elevator 6, fall onto draining screens 7, 8; the medium discharge from these screens is returned to the circuit (not shown in Fig. 2). The sink and float particles, which are still coated with varying quantities of medium, are then passed independently to devices termed density concentrators where they are washed. These concentrators are caused to discharge a dilute medium of a density sufficiently high (1.5 to 1.6) to be sent directly to the flotation cells or filters. These means which I prefer to use to raise the density of the dilute medium to this extent, at the washing screens themselves, are indicated at 9, 9ª in the drawings, and will be described hereafter. The overflow of medium from weir 10 in elevator casing 11 usually joins the tailings on the screen 7. The preconcentrated pulp from these various sources passes by connections indicated at 12, either passing directly, by connection 13, to filter 14, or partly by this path to the filter and partly by connection 18 to the flotation cells 16 for re-cleaning. The re-floated solids from cells 16 pass, as indicated at 17, to the same filter 14, the cake from this filter at least in part passing, as indicated at 18, to the re-pulper 2. The comparatively dilute pulp from the ball mill is utilized to re-pulp the cake from the filter, at this point, into medium of the operating density. If re-conditioning is required, a part of the medium is withdrawn, this conveniently taking place after it has passed through the flotation cells and filter, as indicated at 19, and this can be discharged as market concentrates. If part of the medium is thus withdrawn from the system, the resulting deficit will be made up by pulp from the ball mill-classifier circuit prepared as will be described, so that in normal operation the chief feed for the separator will come from draining screens 7, 8 and by connection 18 to the re-pulper, with whatever loss to the system required for re-conditioning occurs, as indicated at 19, made up from the ball mill-classifier. The above circuit is referred to here for purposes of illustration and other slightly modified circuits will be more appropriate under different circumstances, as will be described hereafter.

As to re-cleaning, the frequency or rate at which re-cleaning must be practiced will depend on the efficiency of removing slimes in the washing of the ore, before the latter is fed to the separator, and also on the softness of the gangue constituents. This rate may be established by ascertaining the increase in surface area of the solids of the medium after its passage through the screens before its passage through the flotation cells, and also its surface area after the flotation treatment. Increase of surface before flotation (in reference to the surface area of the initial medium, per unit of volume in each case) is the net result of changes which are to be corrected both, if necessary, by re-cleaning and re-conditioning. The difference between the surface areas after and before the flotation treatment indicates the part of the increase of surface attributable to slimes and gangue attrition, which are removable by flotation. It is therefore evident that the rate or frequency of re-cleaning (usually, the proportion of the used medium stream which is subjected to treatment in the flotation cells) is determined by the ratio $$\frac{S^1 - S^2}{S}$$

where $S^1$ and $S^2$ are the aggregate surface areas of solids before and after flotation treatment, and $S$ is the aggregate surface area of the solids of the initial medium, per unit of volume in each case. The froth from the flotation, if no substantial attrition or disintegration of the minerals or the solids composing the medium takes place, should almost regain the original character of the fresh medium. Accordingly, the rate of re-cleaning is determined, it being understood that, in accordance with the extent of the "gap" provided in the particular case, a greater or less increase in viscosity of the medium, during operation, can be tolerated. This rate being determined, (it should be fairly constant for each particular operation), the procedure may be to by-pass a calculated percentage of the medium arriving at point 20 in the diagram, Fig. 2, continuously through the flotation cells 16, the balance of the medium stream passing direct to the filter 14. An alternative procedure would be to pass the whole medium stream directly to the filter, for part of the time, and to switch it over, to all pass through the flotation cells, at determined intervals and for determined lengths of time.

If, upon test of the medium after passage through the flotation cells, its stability or viscosity or both are found to have deteriorated, that is a sign that either too many coarse and intermediate, or too many fine, mineral particles were added to it during its passage through the sink-and-float unit. By checking up on the viscosity and stability of the medium at this point the cycle required for re-conditioning can easily be established.

The frequency of re-conditioning is dependent on (a) the friability, and consequently the rate of attrition, of the ore minerals; (b) the disintegration of the medium solids during service; and (c) the "gap" between viscosity of the freshly prepared or re-conditioned medium and the maximum viscosity which can be tolerated. It is obvious that if one succeeds in preparing a medium with an initial viscosity of 1.1, and a maximum viscosity of 1.4 is tolerated, the rate of withdrawal of medium for re-conditioning will be less than in cases where the initial medium has a viscosity of 1.25 and there is the same maximum tolerable viscosity.

Regarding (a), the products of attrition are, generally speaking, within a constant size range and they very rarely consist of —1500 mesh material, but usually cover the full range of the other size fractions of which the medium is composed, i. e. between 300 and 1500 mesh in size. A considerable part of these products of attrition consist of +300 mesh particles and should be removed in any event.

Regarding (b), the production of mineral fractions interfering with the size composition of the medium is promoted by the violent motion and/or mechanical means used in the separator or by conveying the medium through restricted cross sections at excessive velocities. The disintegration of the medium during use is entirely dependent on (1) the velocity in the pipes; (2) the type of pumps used; (3) the intensity of circulation for a given separator capacity; and (4) the hardness of the solids.

Regarding (c), the new medium introduced should rejuvenate the medium in circuit, so that the medium feed for the separator, comprising old medium returned from the screens 7, 8 and the filter plus some new medium from the ball mill-classifier, should have a viscosity approaching the initial viscosity of the original medium feed. It is obvious that by starting at the lowest viscosity permissible for the given range more deleterious components may accumulate before either re-cleaning or re-conditioning becomes necessary than would otherwise be the case. It should also be noted that the effective benefit of a larger "gap" will be enhanced by due care in avoiding rapid and substantial changes in the particle distribution of the medium, due to causes specified under (b) in the preceding paragraph.

Reconditioning has been accomplished in the prior art, with greater or less success, by various expedients, such as the continuous withdrawal of intermediates in the Pearson Patent No. 2,206,574, or the continuous withdrawal of fines and extremely coarse particles, as advocated by other prior inventors, with replacement by coarse solids in each instance. I found, however, that it is very difficult to withdraw in continuous operation certain size fractions from a suspension and to make a selective "cut" between the desired and undesirable sizes and prefer, therefore, in most cases, to withdraw a portion of the total medium in circulation, continuously. The Pearson method of removing intermediates may, to be sure, be recommended in those density ranges where the "gap" is very narrow, but this procedure seems to entail unnecessary complications in those cases, namely, the majority of practical applications where the "gap" is wider. And as to the methods referred to in which principally fine particles are withdrawn, and replaced by a make-up of chiefly coarse particles, it appears that such procedures would result in the medium constantly changing in composition, becoming increasingly unstable and segregating, for the reason that the products of attrition, added to the medium during its use, are not identical in size composition with the size fractions which are withdrawn. In fact, the products of attrition usually lie either in the 300–800 or 800–1500 mesh range, i. e., exactly in the range which is retained in the circuit in such processes. Such procedures of reconditioning would be disadvantageous for use in connection with the process herein described, since, with selective withdrawals of fine particles and simultaneous re-introduction of coarse ones it would be difficult, if not impossible, to so rejuvenate the medium as to re-establish the surface area of the solids at or about the S min. figure and to retain the desired balanced conditions. In fact, as described hereinafter, often not the removal, but on the contrary, the addition of −1500 mesh fine particles will be indicated, and the indiscriminate withdrawal of fines would completely alter the characteristics of the medium with all consequential effects on the separating process.

My preferred procedure, therefore, consists in a continuous withdrawal of a portion of the medium on a quantitative, not a selective, basis, as stated, and substituting therefor make-up medium produced in the ball mill-classifier circuit, the specific surface area of the added pulp being so calculated as to restore, when added to the remainder, the approximate surface area specified by S. min. This applies, of course, to operations with a closed medium circuit, since re-conditioning will be unnecessary when operating with an open circuit, as long as the necessary specifications are strictly observed in the process of preparing the fresh medium.

The preferred procedure is first to ascertain the size range and percentages of the particles in the used medium produced by attrition. As has previously been stated, tests should be made of the medium both before and after its passage through the flotation cells. The latter test, enabling the operator to record, with due observation of the time lag, the composition of the medium, will establish the increase in surface area which should be removed, (or decrease which should be made good), and the rate of such change. This is a comparatively simple procedure (previously described herein), and the facts, once established, will determine the percentage of medium flow which is withdrawn from the circuit, continuously, and the readjustment of the ball mill-classifier circuit to re-balance the medium.

As to this readjustment, it should be noted that the particle size range of the products of attrition will primarily depend on the hardness of the mineral. Thus, very hard sulphide ore, for instance, will inevitably produce attrition products whose size will be in the coarse range, whereas very friable sulphides will tend to disintegrate into pivot, intermediate, and only rarely into a certain percentage of fine particles. Therefore, in the former case the ball mill will have to be set to produce a large percentage of fines in order to counter-balance the increased percentage of coarse accumulated in the circuit. In the latter case the reverse is required.

Figure 3:
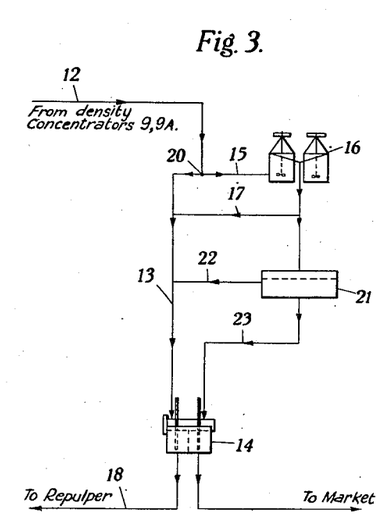
Fig. 3 is an alternative closed medium circuit, partly shown.

The above procedure which results in the modest withdrawal of solids during operations is useful where the source for the make-up concentrates is nearby or where for any reason the cost of the same is not heavy. In some cases however the quantity of solids finally bled off the circuit must be kept as low as possible, on account of the high depreciation due to high freight charges, or other local circumstances. In such cases an alternative reconditioning procedure will be as is indicated in Fig. 3. As is here shown, the dilute medium from the density concentrators divides, as in the circuit illustrated in Fig. 2, part going direct to the two-compartment filter 14, while a determined proportion passes to the flotation cells 16 for re-cleaning, some of the re-cleaned medium also going to the filter, as before. The medium to be bled off the circuit however, now goes from the flotation cells, unfiltered into a reservoir 21, where it is allowed to accumulate until the reservoir is full. The medium is then examined, and its composition and the aggregate surface area of its solids readjusted, either by selective removal or addition of certain fractions; in either case the intention is to provide a material which, re-introduced into the medium circuit, in the same way as that from the ball mill, will so far as possible, reduce or increase the surface area of the solids of the medium to the neighbourhood of S. min. If the correction was by addition without any removal of fractions, all of the treated material passes, as indicated at 22, to the filter, the cake from which passes to the re-pulper; if the correction was by removal of a fraction or fractions, the remainder passes by the same path to the filter and the medium circuit, while the rejected sizes, as indicated at 23, pass through a compartment of the filter, and may then be sold.

If selective removal of fractions is required for this method, controlled segregation from the fairly concentrated pulp is called for. This can be quite easily achieved after a sample has been carefully tested in the laboratory. The rate of dilution and the time allowed for segregation and the depth of settlement for the respective fractions can easily be determined, and these conditions reproduced in a batch treatment of the medium under static conditions.

It will be appreciated that the continuous removal of certain fractions is not identical in effect with the batch treatment here described, because it is almost impossible even from very dilute pulps to obtain in a continuous classifier a clear-cut separation between two, or even more, fractions, but it is comparatively easy to accomplish a readjustment of the total surface area of all solids, and the partial removal of course, or coarse plus intermediates, whichever of these had grown to be out of proportion, from time to time as apparently required, in a static batch treatment process as described. By practising this method, the replacement of solids by way of the ball mill will be at a modest rate, since the stock is largely corrected by returning the re-classified medium to that in circulation. Such a method of occasional reclassification should, of course, only be practised if the costs of such treatment are lower than the depreciation of the solids if re-sold.

Figure 4:
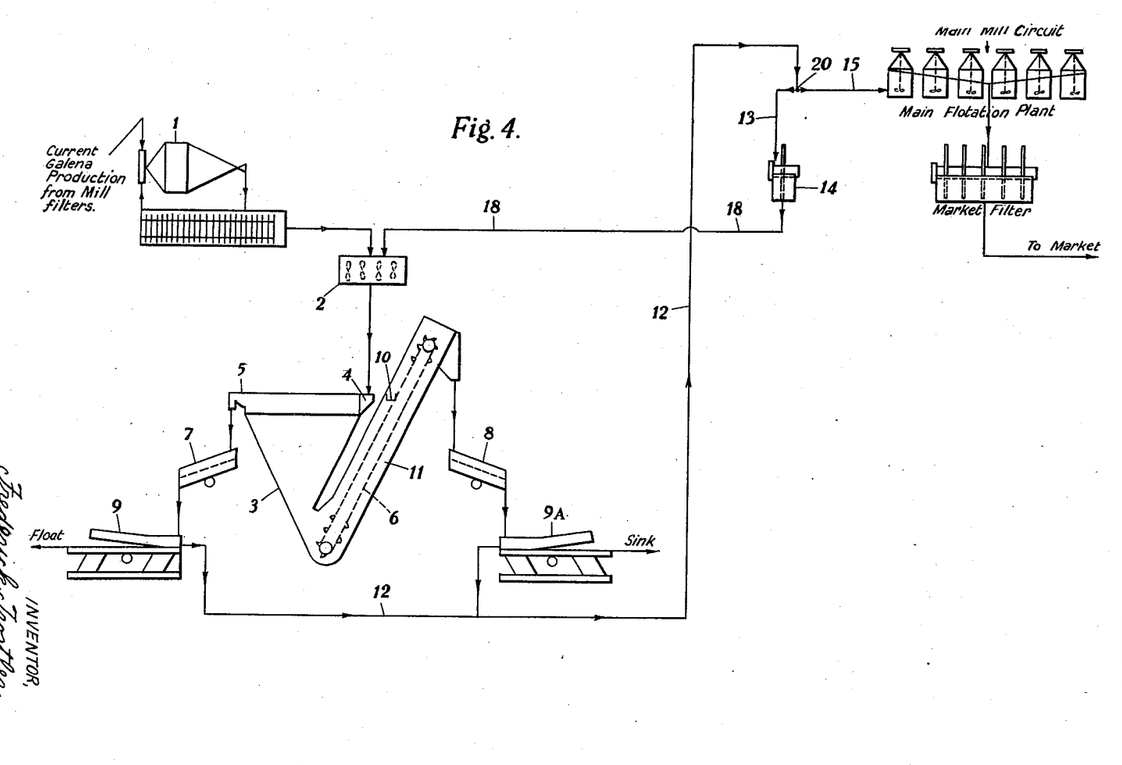
Fig. 4 is an open medium circuit.

Fig. 4 shows an open medium circuit, in which re-cleaning is provided for, as part of the mill flow sheet, but no re-conditioning is required. No explanation in addition to that previously given seems to be called for.

One further point of my improved method, whereby the necessity of employing thickeners in the circuit is removed, remains to be described. As has previously been mentioned, the "float" and "sink" washing systems previously in use in ore treatment have been modified to produce a pulp of about 1.5 density from the washing system, thus eliminating the thickeners previously used. The selective classification of the pulp for the purpose of re-conditioning, as practised in the prior ore treatment art, had to be carried out with a very dilute pulp of about 1.1 density or lower, hence the elimination of the thickeners was neither indicated nor practicable.

My process as described herein, however, specifies the use of a comparatively high density medium in the re-conditioning and re-cleaning circuit permitting the omission of thickeners. To accomplish this, the adhering medium is washed off the float and sink particles after their discharge from the medium drainage screens in such a manner, and with an addition of fresh water so calculated, as to produce cleanly washed tailings and concentrates, and at the same time overflowing the dilute medium from this process at a density sufficiently high to enable it to be fed direct to the flotation cells or the filters i. e. more than 1.3, and preferably of 1.5 to 1.6. It will be noted that the operation referred to brings down the density of the medium from the range which is required in ore dressing operations, (say from about 2.6 to 3.0, down to about 1.3 to 1.6, as stated, with a galena medium). Put in more general terms, it should be said that the used medium, before the washing and dilution, contains from 60 to 85 weight per cent of solids (slightly more than the range indicated in Fig. 1 of the drawings), and by the washing it is diluted to produce a suspension containing from 25 to 40 weight per cent of solids.

Figure 5:
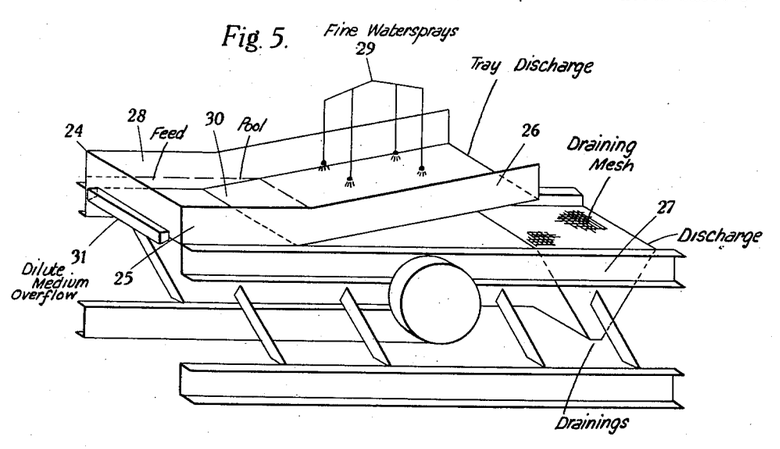
Fig. 5 is an isometric view of means for concentrating used medium, incorporating a "float" or "sink" washing system.

The operation, broadly speaking, consists in causing movement of products of the separating operation with medium adhering thereto in or through water, on the counter-current principle, whilst simultaneously causing a vigorous rubbing or scrubbing action of the solids to cause removal of the adhering medium from the products, the washed products then being removed; the rate of supply of the water in this operation must be so calculated that, when added to the medium, the latter is brought down from a suspension containing 60 to 85 per cent to one containing 25 to 40 per cent of solids, by weight. This may be accomplished by various means, for example by the devices shown in Fig. 5, in which a pan 24, having an horizontal portion 25 and an upwardly inclined portion 26, is mounted on the washing screen 27 of jigger type. The feed from the medium drainage is introduced, at 28, into the horizontal portion of the pan, and sprays of water 29 play on the inclined end of the pan. The angle of inclination of this part of the pan being suitably adjusted, by test, (as for example, about 12° where tailings are treated), the jigger motion causes the tails or sink particles to travel up the slope of the pan and discharge over the end on to the screen. Sprays 29 wash the product, and the water runs down the incline to form a pool 30 together with the medium washed off the particles. In this example the jigging action and the water cause the vigorous scrubbing action above referred to. It has been found that the solid particles of the medium do not work their way up the incline, but remain in the pool, the overflow from which, through a slot 31, goes into the circuit to the filter and back to the repulper, as has been described. With a properly regulated flow of water, the medium can be discharged at the required density, the final tailings being remarkably clean. Operating upon galena tailings, it was found that only about one gallon of wash water per cwt. of tailings treated was required.

The method just described results in the elimination of thickeners from the circuit, with the result of lower capital costs, less ground space and lower pumping costs. Another result is that the finest particles of the medium solids, which tend to be lost with the overflow of thickeners, are saved; also there is a quicker return of solids into the main separating circuit than is the case when one or more thickeners are employed, so that less of the medium solid material has to be kept in stock. The extensive thickener capacity required in some processes makes the installation of sink-and-float plants difficult if not impossible in some cases, as where underground installation is desired, and the extensive storage and pumping facilities required to move large quantities of dilute medium and other disadvantages.

To revert, finally, to the matter of calculating the surface areas of individual particles, and therefore the correct aggregate figures, the calculations described in the earlier part of this specification refer to particles of cubic shape. The ratio between mass and surface of such cubical particles and the ratio between mass and surface of spherical particles differ only very slightly, so that the rules given may be considered as standing good for both shapes.

I claim:

1. In a process of preparing a heavy suspension medium, comprising a dispersion in liquid of insoluble solid particles of desired material having sizes within a range extending from about 50 microns to about 2 microns, for use in the sink and float separation process, which medium is to have a prescribed density and corresponding solid/water ratio within the range between 23/77 and 39/61 and a settling rate and a viscosity no greater than prescribed maxima, the steps which consist in feeding said material to a grinder-classifier combination, adjusting the latter to produce particles within said size range, suspending the particles produced in liquid to form a suspension having the ratio of solid to liquid required for the prescribed density, measuring the aggregate surface area of the solids therein per unit of volume of such suspension, adjusting said grinder-classifier combination to vary such surface area per unit of volume until the latter, as determined by fresh measurements is equal to or slightly greater than the minimum aggregate surface area of particles of such material per unit of volume of such suspension which produces a settling rate of such suspension at such density no greater than, and a viscosity less than, such prescribed maxima, and operating such combination to produce such particles.

2. In a process of preparing a heavy suspension medium, comprising a dispersion in liquid of insoluble solid particles of desired material having sizes within a range extending from about 50 to about 2 microns, for use in the sink and float separation process, which medium is to have a prescribed density and corresponding solid/water ratio within the range between 27/73 and 37/63, and a settling rate and a viscosity no greater than prescribed maxima, the steps which consist in preparing a suspension in liquid of particles of said material within said size range having the ratio of solid to liquid required for the prescribed density, measuring the aggregate surface area of the solids therein per unit of volume of such suspension, and reconstituting such suspension without altering its solid to liquid ratio by varying the finely divided solids therein until the aggregate surface area of the solids therein per unit of volume is not less than the minimum nor greater than the maximum aggregate surface area of particles of said material per unit of volume which produces a settling rate of such suspension at such density no greater than and a viscosity less than such prescribed maxima.

3. In a process of separating minerals in a bath composed of heavy solids suspended in a liquid medium, the step which comprises measuring the surface area of the medium and adding finely divided solids to the bath or removing finely divided solids from the bath until the surface area is between 4.0 and 6.4 square meters for each 100 grams of medium at a specific gravity of 2.85.

4. In a sink and float mineral separation process, in which a heavy relatively stable suspension medium, comprising a dispersion of finer and coarser particles in liquid, is fed to the separating vessel and continuously withdrawn therefrom after use, the steps which comprise treating a portion of the used medium in flotation cells to remove deleterious material therefrom by flotation and returning the remainder to the separator medium feed, measuring the surface area of the returned medium and of the used medium, and adjusting the proportions of the two mediums in accordance with such measurements.

5. In a sink and float mineral separation process, the steps which consist in preparing a heavy suspension medium of desired density comprising a dispersion in liquid of insoluble solid particles of various sizes ranging from comparatively coarse to very fine, which medium is determined to have desired stability characteristics and viscosity less than a prescribed maximum, measuring the surface area of the medium, ascertaining the increase in aggregate surface area of the particles in suspension per unit of volume of such medium which will cause the viscosity thereof to increase to the prescribed maximum without adversely affecting the stability characteristics thereof, using the medium in sink and float separation, in circuit, treating the same as required to prevent the aggregate surface area of the solids thereof per unit of volume from increasing more than such ascertained amount, and periodically measuring the surface area of the medium to ascertain that it stays within the limits ascertained.

6. In a sink and float mineral separation process, the steps which consist in initially feeding a heavy suspension medium to the separating vessel, said medium comprising a dispersion in liquid of insoluble solid particles of various sizes ranging from comparatively coarse to very fine, continuously withdrawing used medium from the separating vessel, periodically ascertaining by measurement of the surface area of the medium the increase or decrease of aggregate surface area of the solids of the used medium, per unit of volume, due to the separating operation, continuously withdrawing from the used medium stream a percentage of the total flow thereof, undivided as to size fractions, returning the remainder thereof to the separator medium feed, and adding thereto fresh medium to replace the used medium which has been withdrawn, so composed of a plurality of size fractions that the aggregate surface area of the solids thereof per unit of volume is less than, or greater than that of the solids of the withdrawn medium, in accordance with whether the used medium had increased or decreased, in aggregate surface area of solids per unit of volume.

7. In a sink and float mineral separation process, the steps which consist in initially feeding a heavy relatively stable suspension medium, the aggregate surface area of the solids of which per unit of volume is known, to the separating vessel, said medium comprising a dispersion in liquid of insoluble solid particles within a size range from comparatively coarse to very fine, continuously withdrawing used medium from the separating vessel, periodically ascertaining by measurement of the surface area of the medium the increase or decrease in aggregate surface area of the solids of the medium, per unit of volume, due to attrition, and the rate of such increase or decrease, continuously withdrawing from the used medium stream a percentage of the total flow thereof, undivided as to size fractions, returning the remainder thereof to the separator medium feed, and adding thereto fresh medium to replace the used medium which has been withdrawn, the percentage of used medium withdrawn being greater or less as the increase or decrease in aggregate surface area of the solids per unit of volume of the same per unit of time is greater or less, and the fresh medium added having a reduced or increased aggregate surface area of solids per unit of volume such that, when added to the returned used medium, the aggregate surface area of solids per unit of volume of the feed thus formed will be approximately the same or only slightly greater than the aggregate surface area of solids per unit of volume of the initial medium.

8. In a sink and float mineral separation process, in which a heavy relatively stable suspension medium, comprising a dispersion of finer and coarser particles in liquid, is fed to the separating vessel and continuously withdrawn therefrom after use, the steps of filtering part of the used medium stream and treating a further portion in flotation cells to remove the deleterious gangue material by flotation, filtering part of the refloated solids and withdrawing the remaining portion without classification from the circuit, mixing the filter cake in a repulper from which the separator medium stream is supplied, with fresh dilute pulp to replace the withdrawn used medium, said dilute pulp having aggregate surface area of the solids thereof, per unit of volume, less or greater than the same ratio in the case of the withdrawn used medium calculated to compensate for increase or decrease in the said ratio in the case of the used medium.

9. In a sink and float mineral separation process, in which a heavy suspension medium, comprising a dispersion of insoluble solid particles in liquids, is fed to the separating vessel and continuously withdrawn therefrom after use, the withdrawn portion containing from 60 to 85 weight per cent of solids, the steps which comprise causing movement of products of the separating operation with adhering medium in water on the counter-current principle, whilst simultaneously causing vigorous scrubbing action of the said products in the water to cause removal of the adhering medium from said products, the rate of supply of said water being so calculated that the medium will be diluted thereby just sufficiently to produce a suspension containing 25 to 40 weight per cent of solids, removing the washed products, and using the dilute medium in further operations.

10. In a sink and float mineral seperation process, in which a heavy relatively stable suspension medium, comprising a dispersion of finer and coarser particles in liquid, is fed to the separating vessel and continuously withdrawn therefrom after use, the steps of treating a portion of the used medium in flotation cells to remove deleterious material therefrom by flotation and returning the remainder to the separator medium feed, accumulating the refloated solids from the flotation cells in a pool until a substantion amount thereof is contained in the pool, measuring the aggregate surface area of the solids therein per unit of medium, measuring the aggregate surface area of solids per unit of the fresh medium which is being fed to the separator, readjusting the aggregate surface area per unit of the medium in said pool into substantial equality with the aggregate surface area per unit of the fresh medium as determined by such measurement, and returning said readjusted medium to the separator medium feed.

FREDRICK TROSTLER.